United States Patent
Schmidt

(10) Patent No.: US 8,826,535 B2
(45) Date of Patent: Sep. 9, 2014

(54) METHOD FOR MANUFACTURING AN INTEGRALLY BLADED ROTOR

(75) Inventor: Robert Schmidt, Karlsfeld (DE)

(73) Assignee: MTU Aero Engines GmbH, Munich (DE)

( * ) Notice: Subject to any disclaimer, the term of this patent is extended or adjusted under 35 U.S.C. 154(b) by 261 days.

(21) Appl. No.: 13/269,807

(22) Filed: Oct. 10, 2011

(65) Prior Publication Data
US 2012/0090175 A1 Apr. 19, 2012

(30) Foreign Application Priority Data
Oct. 16, 2010 (DE) .......................... 10 2010 048 732

(51) Int. Cl.
*B21K 25/00* (2006.01)
*F01D 5/30* (2006.01)
*B23P 15/00* (2006.01)

(52) U.S. Cl.
CPC .......... *F01D 5/3061* (2013.01); *F05D 2230/64* (2013.01); *B23K 2201/001* (2013.01); *F05D 2250/314* (2013.01); *B23P 15/006* (2013.01)
USPC ..................................................... 29/889.21

(58) Field of Classification Search
CPC ........ B23P 15/006; B23P 15/02; B23P 15/04; F01D 5/3061; F01D 5/34
USPC ................... 29/889.2, 889.21, 889.7, 889.71, 29/889.72; 416/204 R, 213 R
See application file for complete search history.

(56) References Cited

U.S. PATENT DOCUMENTS

| | | | |
|---|---|---|---|
| 3,590,454 A | 7/1971 | Brass | |
| 2005/0249599 A1* | 11/2005 | Hemsley et al. | 416/204 R |
| 2008/0304972 A1* | 12/2008 | Xiao | 416/203 |
| 2011/0176922 A1* | 7/2011 | Schmidt | 416/213 R |

FOREIGN PATENT DOCUMENTS

| | | |
|---|---|---|
| DE | 3725132 A1 | 2/1988 |
| DE | 10336587 A1 | 2/2005 |
| DE | 102006061448 A1 | 6/2008 |

* cited by examiner

*Primary Examiner* — Ryan J Walters
(74) *Attorney, Agent, or Firm* — Barlow, Josephs & Holmes, Ltd.

(57) ABSTRACT

The invention relates to a method for manufacturing an integrally bladed rotor, whereby several rotating blades are attached to a basic rotor body by welding in such a way that first, grooves into which the rotating blades are introduced by their blade feet or adapters, and which extend substantially in the axial direction of the basic rotor body, are introduced into the basic rotor body radially outside, prior to attaching the rotating blades, then, the rotating blades are welded to the basic rotor body, wherein the grooves are introduced in the rotor body and the blade feet or adapters are formed on the rotating blades in such a way that a central axis of the grooves is positioned obliquely relative to a central axis of the blade feet or the adapters, so that a pre-twisting is formed on the rotating blades when the rotating blades are introduced into the groove.

12 Claims, 2 Drawing Sheets

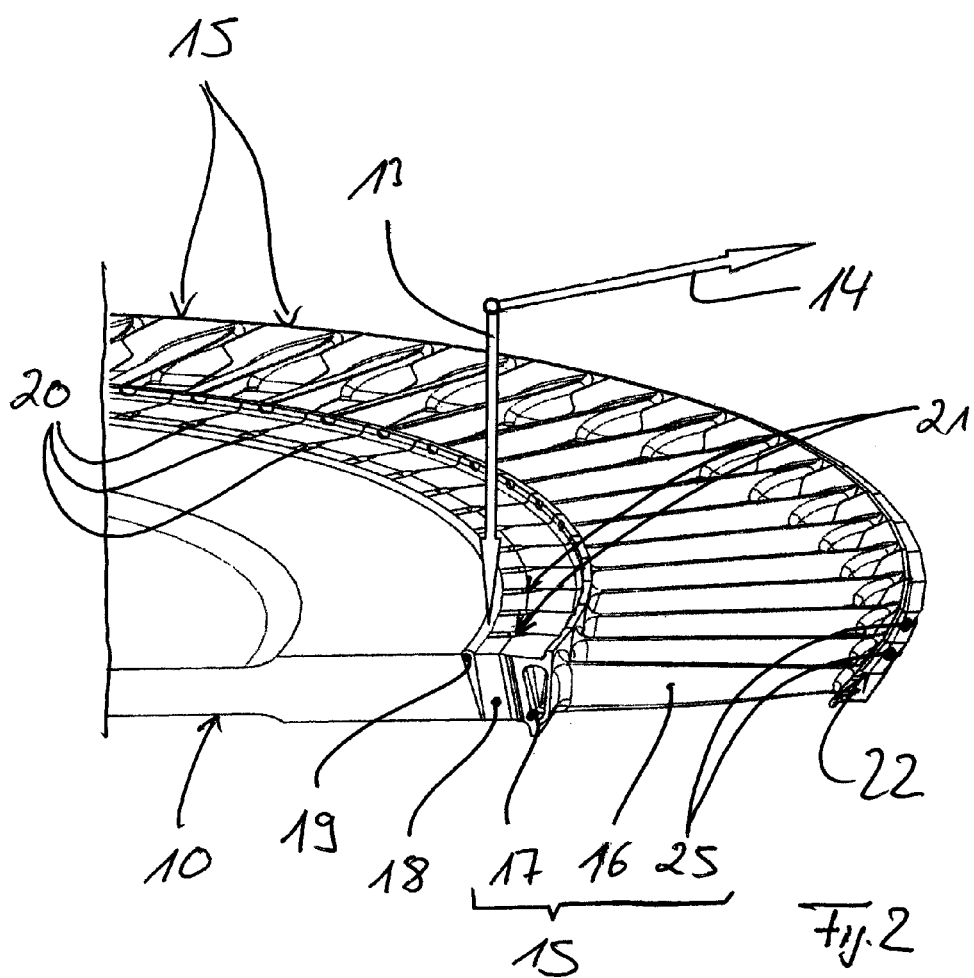

METHOD FOR MANUFACTURING AN INTEGRALLY BLADED ROTOR

CROSS REFERENCE TO RELATED APPLICATION

N/A

BACKGROUND OF THE INVENTION

The invention relates to a method for manufacturing an integrally bladed rotor.

In gas turbines, such as, for example, in gas turbine aircraft engines, rotors designed as integrally bladed gas turbine rotors are increasingly being used. An integrally bladed rotor provides a basic rotor body and several rotating blades joined to the basic rotor body. Depending on whether a disk-shaped basic rotor body or a ring-shaped basic rotor body is used, an integrally bladed rotor is also called a blisk (bladed disk) or bling (bladed ring).

A method for manufacturing an integrally bladed rotor, in which rotating blades are attached to a rotor support by means of a welding process is known from DE 103 36 587 A1. According to this prior art, capacitor-discharge welding is applied as the welding method.

From U.S. Pat. No. 3,590,454 A, a method is known for manufacturing an integrally bladed rotor, in which rotating blades are attached to a rotor support by means of a welding process in such a way that first, grooves into which the rotating blades are inserted by their blade feet and which are extended substantially in the axial direction of the basic rotor body, are introduced into the basic rotor body radially outside, prior to attaching the rotating blades, and that subsequently, the rotating blades are welded to the basic rotor body.

Proceeding therefrom, the problem of the present invention is to create a novel method for manufacturing an integrally bladed rotor.

SUMMARY OF THE INVENTION

This problem is solved according to a first aspect of the invention by a method according to the present invention. Accordingly, the grooves are introduced into the basic rotor body and the blade feet or adapters are formed on the rotating blades in such a way that a central axis of the grooves is positioned obliquely relative to the central axis of the blade feet or the adapters, so that prior to introducing the rotating blades into the grooves, a "pre-twisting" is produced on the rotating blades. This permits a particularly simple manufacture of integrally bladed rotors within a short time, with less effort, with fewer manufacturing steps and with reduced costs. A complicated assembly mechanism may be dispensed with. No prefabricated blade ring needs to be produced to be attached to the basic rotor body by tacking or welding.

According to a first advantageous enhancement of the first aspect of the invention, the blade feet or adapters of the rotating blades are introduced into the grooves in the axial direction of the basic rotor body, whereby, for this purpose, first of all, the rotating blades are pre-positioned in the region of the basic rotor body with the formation of a loose ring of rotating blades, whereby, in this case, the rotating blades are guided radially inside by the basic rotor body in the region of the blade feet or of the adapters, and radially outside by means of a device, and whereby, following this, the individual rotating blades are introduced one at a time in the axial direction into the grooves, so that the pre-twisting is automatically formed when the rotating blades are introduced into the grooves.

According to a second advantageous enhancement of the first aspect of the invention, the blade feet or adapters of the rotating blades are introduced into the grooves in the radial direction, whereby, for this purpose, first the rotating blades are twisted radially inside by a device in the region of the blade feet or of the adapters, in such a way that the central axis of the blade foot or of the adapter of a rotating blade to be mounted and the central axis of the groove of the basic rotor body run parallel to one another, and whereby subsequently, each rotating blade is introduced into the respective groove in the radial direction and thus is released from the device, whereby the pre-twisting is formed in the respective groove before and during the introduction of the rotating blade.

According to a second aspect of the invention, this problem is solved by a method according to the present invention. According to this method, following the welding of the rotating blades to the basic rotor body, the shoulders delimiting the grooves of the basic rotor body are at least partially removed. Recesses acting as relief boreholes may be formed between the rotating blades in the region of the blade feet or the adapters, and these boreholes permit the integrally bladed rotor to be subjected to higher stresses during operation.

The two aspects may be applied either alone or in combination with one another, preferably in the manufacture of integrally bladed rotors with an outer shroud.

BRIEF DESCRIPTION OF THE DRAWINGS

Preferred enhancements of the invention are taken from the subclaims and the following description. Embodiment examples of the invention will be explained in more detail based on the drawings, but are not limited thereto, in which:

FIG. 2 shows an excerpt from a finished, integrally bladed rotor in perspective view.

DETAILED DESCRIPTION OF THE PREFERRED EMBODIMENTS

Figure 1:
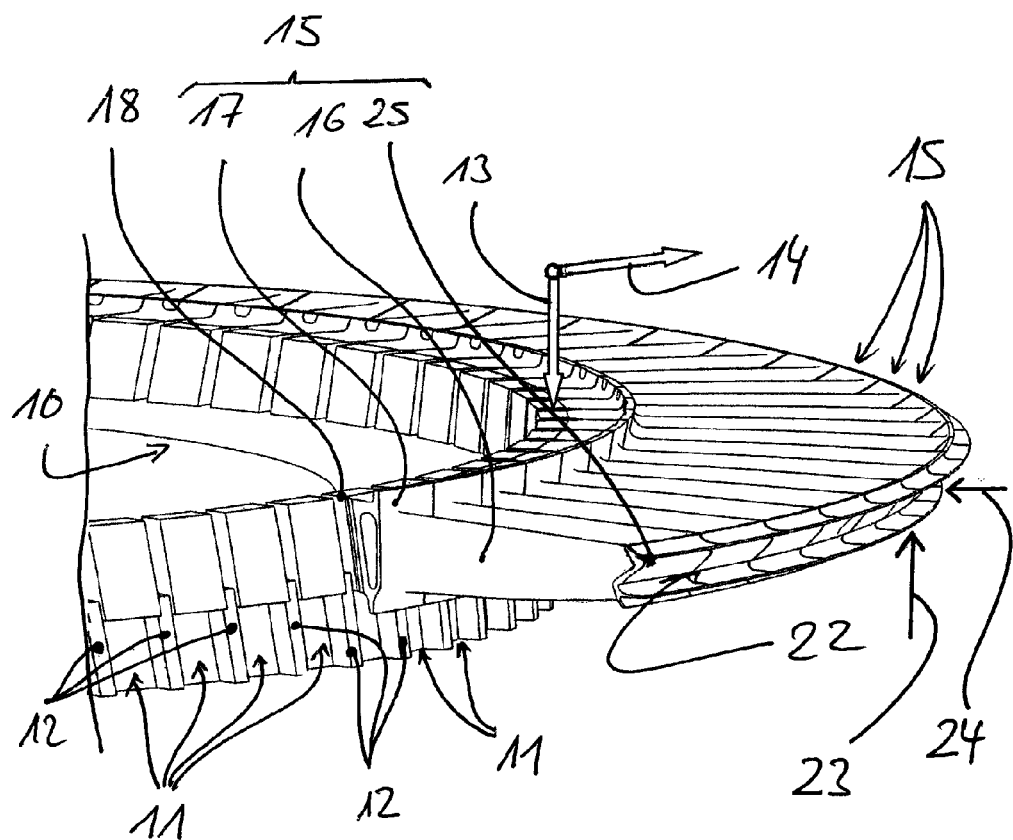
FIG. 1 shows an excerpt from a partially manufactured, integrally bladed rotor in perspective view.

The invention present here relates to a method for manufacturing an integrally bladed rotor, in particular, an integrally bladed gas turbine rotor. Such a rotor provides a basic rotor body as well as several rotating blades.

Then, if a disk-shaped basic rotor body is used, the integrally bladed rotor is called a blisk (bladed disk). In contrast, if a ring-shaped basic rotor body is used, the integrally bladed rotor is called a bling (bladed ring).

For the manufacture of an integrally bladed rotor according to the invention, the procedure is such that first a basic rotor body 10 is provided.

Grooves 11 extending substantially in the axial direction of the basic rotor body 10 are introduced radially outside in the basic rotor body 10. Adjacent grooves 11 are delimited in each case by a shoulder 12, which also extends substantially in the axial direction of the basic rotor body. The axial direction of the basic rotor body 10 is visualized in FIG. 1 by an arrow 13. Another arrow 14 denotes the radial direction of the basic rotor body 10.

In addition to the basic rotor body 10 with its grooves 11 delimited from one another by the shoulders 12, rotating blades 15 are provided. The rotating blades 15 provide a blade 16 and a blade foot 17. In addition, the rotating blades 15 according to FIGS. 1 and 2 provide outer shroud segments 25, which form an outer shroud 22 of the rotor to be manufactured.

In the example of embodiment shown, on the blade foot 17 of each rotating blade 15, an adapter 18 is attached, by means of which the respective rotating blade 15 can be inserted into a groove 11 in the basic rotor body 10. It should be pointed out that several adapters 18 without rotating blades 15 are shown in FIG. 1, in order to assure a clear presentation. Rotating blades 15, however, are joined via their blade feet 17 to these adapters 18. The adapters can also replace the blade feet.

As already mentioned, the grooves 11, which extend substantially in the axial direction 13 of the basic rotor body 10, are delimited from one another by shoulders 12. The grooves 11 are placed obliquely relative to the axial direction 13 of the basic rotor body, so that accordingly, the central axes of the grooves 11 do not run parallel to the axial direction 13 of the basic rotor body 10, but rather enclose a first angle with the axial direction. This first angle preferably amounts to up to 20°, in particular, up to 15°.

Further, the adapters 18 as well as the outer shroud segments 25 are formed on the rotating blades 15 in such a way that they are each placed obliquely relative to the axial direction 13 of the basic rotor body 10, so that accordingly, central axes of the adapters 18 and central axes of the outer shroud segments 25 do not run parallel to the axial direction 13 of the basic rotor body 10.

In this case, the central axes of the outer shroud segments 25 enclose with the axial direction the first angle, thus the same first angle as the central axes of the grooves 11.

The central axes of the adapters 18, in contrast, are obliquely positioned relative to the axial direction 13 of the basic rotor body 10 by a second angle that is different from the first angle, the difference between the first angle and the second angle preferably mounting to between 1° and 5°.

It follows from this that the central axes of the grooves 11 are obliquely positioned relative to the central axes of the adapters 18. In addition, the central axes of the outer shroud segments 25 are obliquely positioned relative to the central axes of the adapters 18. The central axes of the grooves 11 and the central axes of the outer shroud segments 25, in contrast, are not obliquely positioned relative to one another; rather, they run parallel to one another.

Then, when such rotating blades 15 are introduced into such grooves 11, during the introduction of the rotating blades and/or prior to introducing the rotating blades 15 into the grooves 11, a "pre-twisting" is produced on the rotating blades 15.

Subsequent to introducing the rotating blades 15 via the adapters 18 into the grooves 11 of the basic rotor body 10, the rotating blades 15 are welded to the basic rotor body 10, i.e., preferably by means of electron-beam welding, which is also called EB welding.

According to a first advantageous enhancement of the invention, the adapters 18 of the rotating blades 15 are introduced into the grooves 11 in the axial direction of the basic rotor body 10, whereby, for this purpose, first of all, the rotating blades 15 are pre-positioned in the region of the basic rotor body 10 with the formation of a loose ring of rotating blades. In this case, the rotating blades are supported or guided radially inside by the basic rotor body 10 in the region of the blade feet 17 or of the adapters 18, and radially outside by means of a device (not shown), whereby, following this, the individual rotating blades are introduced one at a time in the axial direction into the grooves 11, so that the pre-twisting is automatically formed when the rotating blades 15 are introduced into the grooves 11.

The basic rotor body 10 is preferably aligned horizontally when the rotating blades 15 are introduced by their blade feet 17 or by the adapters 18 attached to the blade feet 17, into the grooves 11 of the basic rotor body 10, i.e., in such a way that the rotating blades 15 are introduced by their blade feet 17 or by the adapters 18 attached to the blade feet 17 from the top into the grooves 11. FIGS. 1 and 2 show this horizontal alignment of the basic rotor body 10. The axial direction 13 of the basic rotor body 10 runs vertically and the radial direction 14 of the same runs horizontally.

Preferably, first, the rotating blades 15 are placed from the top onto the basic rotor body 10, preferably with the formation of a loose ring of blades, whereby, following this, the individual rotating blades are introduced one at a time into the grooves 11 of the basic rotor body 10. The rotating blades 15 are preferably hammered into the grooves 11 of the basic rotor body 10 with slight hammer blows or in another manner, the pre-twisting on the rotating blades 15 automatically being formed thereby.

When the rotating blades 15 are introduced by their blade feet 17 or by the adapters 18 attached to the blade feet 17, into the grooves 11 of the basic rotor body 10, the rotating blades 15 are fixed in place or guided radially outside laterally, and in fact, in the support directions indicated by the arrows 23 and 24 of FIG. 1.

For this purpose, a suitable device (not shown) can be used, whereby the basic rotor body 10 itself functions radially inside as the support device.

Preferably, the grooves 11 of the basic rotor body 10, viewed in the axial direction 13, are contoured conically in such a way that they taper when viewed in the direction of introduction of the rotating blades 15. For this purpose, the shoulders 12 on the axial end of the basic rotor body 10, starting from which the rotating blades 15 are inserted into the grooves 11, are not as thick as on the opposite-lying axial end of the basic rotor body 10. By introducing the rotating blades 15 by their adapters 18 into the conically contoured grooves 11, the rotating blades 15 are already fixed at a certain circumference when they are introduced into grooves 11. Additionally or alternatively, the adapters 18 may also have such a conical contouring.

According to a second, alternative advantageous enhancement of the invention, the rotating blades 15 are introduced into the grooves 11 in the radial direction of the basic rotor body 10, whereby, for this purpose, first the rotating blades 15 are twisted radially inside by a device (not shown) in the region of the blade feet 17 or of the adapters 18, in such a way that the central axis of the blade foot 17 or of the adapter 18 of a rotating blade 15 to be mounted, and the central axis of the respective groove 11, into which the rotating blade is to be introduced by the adapter 18, run parallel to one another, and whereby subsequently, the respective rotating blade 15 is introduced into the respective groove 11 in the radial direction and thus is released from the device, whereby the pre-twisting is formed in the respective groove before and during the introduction of the rotating blade. The device (not shown) in this way twists the rotating blade 15 that is to be mounted on adapter 18 by an amount so as to cause the first angle and the second angle to deviate from one another, so that after the twisting, the respective rotating blade 15 can be inserted by its adapter 18 in the radial direction into the respective groove 11 of the basic rotor body 10.

The introduction of the rotating blades 15 into the grooves 11 determines their alignment in the axial and radial directions.

According to a preferred enhancement of the invention, first all rotating blades 15 are introduced into the grooves 11 of the basic rotor body 10 via the adapters 18 attached to the blade feet 17. After all rotating blades 15 have been pre-mounted on the basic rotor body 10, subsequently all rotating blades 15 are welded to the basic rotor body 10 via at least one circumferential weld 19 in the circumferential direction of the basic rotor body 10.

As can be taken from FIG. 2, the circumferential weld 19 in the circumferential direction of the basic rotor body 10 is formed on the axial end of the basic rotor body 10, out from which the rotating blades 15 are extended when they are introduced in the axial direction via the adapters 18 into the grooves 11 of the basic rotor body 10. This type of circumferential weld in the circumferential direction may also be formed, additionally or alternatively, at the opposite-lying axial end of the basic rotor body 10.

By means of the circumferential weld 19 or each circumferential weld 19 in the example of embodiment shown, the rotating blades 15 are welded to the basic rotor body 10 in such a way that the basic rotor body 10 is welded to the adapters 18, which are joined with the blade feet 17 of the rotating blades 15. The circumferential weld 19 or each circumferential weld 19 is thus extended along a groove base of the grooves 11 and along a radially inner boundary of the adapters 18 attached to the blade feet 17, this boundary being adjacent to the groove base of the grooves 11.

In addition to the circumferential weld 19 or each circumferential weld 19, it is possible to join or to weld the rotating blades 15 by their adapters 18 attached to the blade feet 17 to the basic rotor body 10 via additional welds 20 extending in the radial direction 14 of the basic rotor body 10. The welds 20 extending in the radial direction 14 are then formed along the side walls of the grooves or side walls of the shoulders 12 and along lateral boundaries of the adapters 18 attached to the blade feet 17, these boundaries being adjacent to these side walls of the grooves or the shoulders.

It should be pointed out here that the welds 20 extending in the radial direction 14 are optional. It is possible to provide exclusively at least one weld 19 extending in the circumferential direction.

According to a preferred enhancement of the method according to the invention, subsequent to the welding of the rotating blades 15 to the basic rotor body 10, the shoulders 12, which delimit the adjacent grooves 11 of the basic rotor body 10, are at least partially removed. This is accomplished preferably in that each shoulder 12 that is positioned between two adjacent grooves 11 and extending substantially in the axial direction of the basic rotor body 10 is at least partially removed due to a borehole that can also be called a relief borehole. Each of these boreholes is thus extended along the respective shoulder 12 to be removed, substantially in the axial direction of the basic rotor body 10.

The respective borehole is introduced along this direction into the integrally bladed gas turbine rotor, which is formed from the basic rotor body 10 and the rotating blades 15 that are welded to it. Relief boreholes 21 are schematically shown in FIG. 2. It is possible to completely or also only partially to remove the shoulders 12 by means of the relief boreholes 21. The complete removal of the shoulders 12 is preferred.

In distinction from the above-described, preferred example of embodiment of the invention, it is also possible, in the manufacture of the integrally bladed gas turbine rotor, first to introduce a first rotating blade 15 into a first groove 11 via an adapter 18 assigned to the blade foot 17 of this blade and then to weld this rotating blade 15 to the basic rotor body 10 by a weld extending substantially in the axial direction 13, whereby this weld extending in the axial direction 13, when viewed in the axial direction of the basic rotor body 10, is formed between a shoulder 12 of the respective groove and the adapter 18 of the respective rotating blade 15.

Subsequent to this first rotating blade 15, other rotating blades 15 are then successively or sequentially introduced into corresponding grooves 11 and joined to the basic rotor body 10 by welds extending substantially in the axial direction 13.

In addition, it is then possible to provide at least one weld 19 extending in the circumferential direction and/or welds 20 extending in the radial direction 14.

As already mentioned, in the preferred example of embodiment of the invention, the adapters 18 are joined to the blade feet 17 of the rotating blades 15, the rotating blades 15 being introduced via the adapters into the grooves 11 of the basic rotor body 10 and the welds 19 or 20 being formed in the region thereof. It is then advantageous if the blade foot 17 of the rotating blade 15 is manufactured from a material that is not suited for welding. In this case, an adapter 18 of a material that is suitable for welding can then be joined to the blade foot 17 of the rotating blade 15.

If the rotating blade 15, in particular the blade foot 17 thereof, however, should be made of a material that is suited for welding, then the adapter 18 may also be dispensed with, in which case, the rotating blades 15 will then be inserted directly via their blade feet 17 into the grooves 11 of the basic rotor body 10 and will be welded to these.

The rotating blades 15 are preferably finish-coated with an anti-abrasion protective coating.

It would be appreciated by those skilled in the art that various changes and modifications can be made to the illustrated embodiments without departing from the spirit of the present invention. All such modifications and changes are intended to be covered by the appended claims.

What is claimed is:

1. A method for manufacturing an integrally bladed rotor, comprising the steps of:
    providing a basic rotor body having an axial direction;
    providing grooves in the basic rotor body, the grooves extending substantially in the axial direction of the basic rotor body;
    providing rotating blades, each rotating blade having a blade foot;
    positioning the rotating blades relative to the basic rotor body so the central axis of each groove is positioned obliquely relative to a central axis of each respective blade foot;
    inserting the rotating blades by their blade feet or by adapters respectively connected thereto into their respective grooves so that a pre-twisting is automatically formed on the rotating blades when the rotating blades are inserted into the grooves; and
    welding the rotating blades to the basic rotor body;
    wherein the grooves of the basic rotor body and/or the blade feet or the adapters of the rotating blades are contoured conically in the axial direction of the basic rotor body.

2. The method according to claim 1, wherein an integrally bladed rotor with outer shroud is manufactured, whereby the grooves are introduced into the basic rotor body and the blade feet or adapters as well as outer shroud segments are formed on the rotating blades in such a way that the central axes of the grooves are positioned obliquely relative to the central axes of the blade feet or the adapters, and that the central axes of the grooves and central axes of the outer shroud segments run parallel to one another.

3. The method according to claim 2, wherein the grooves of the basic rotor body and the outer shroud segments of the rotating blades are formed in such a way that they are obliquely positioned relative to an axial direction of the basic rotor body by an identical first angle, and that the blade feet or adapters of the rotating blades are formed in such a way that they are obliquely positioned relative to the axial direction of the basic rotor body by a second angle that is different from the first angle.

4. The method according to claim 1, wherein in the step of inserting the rotating blades by their blade feet or by adapters respectively connected thereto into their respective grooves, first of all, the rotating blades are pre-positioned in the region of the basic rotor body in a formation of a loose ring of rotating blades, whereby, in this case, the rotating blades are guided by the basic rotor body in the region of the blade feet or of the adapters, and are guided at or near the outer shroud segments by means of a device, and that following this, the individual rotating blades are introduced, in particular hammered in, one at a time, in the axial direction into the grooves, so that the pre-twisting is formed on the rotating blades when the rotating blades are introduced into the grooves.

5. The method according to claim 4, wherein the basic rotor body is aligned horizontally, in such a way that the axial direction of the basic rotor body runs vertically and the radial direction thereof runs horizontally, whereby the rotating blades are introduced from above into the grooves by their blade foot or adapter.

6. The method according to claim 1, wherein first, all rotating blades are introduced by their blade feet or by their adapters into the grooves of the basic rotor body, and that subsequently all rotating blades are welded to the basic rotor body via at least one circumferential weld in the circumferential direction of the basic rotor body.

7. The method according to claim 6, wherein either the blade feet of the rotating blades are joined to the basic rotor body or the adapters are joined to the basic rotor body via the at least one circumferential weld, whereby the at least one circumferential weld is extended along a groove base of the grooves and along a radially inner boundary of the blade feet or of the adapters, this boundary being adjacent to the groove base of the grooves.

8. The method according to claim 6, wherein in addition to the circumferential weld or each circumferential weld, the rotating blades are welded by their blade feet or by their adapters to the basic rotor body via welds extending in the radial direction of the basic rotor body, whereby the radial welds preferably extend along the side walls of the grooves and along the lateral boundary of the blade feet or the adapters adjacent to the side walls of the grooves.

9. The method according to claim 1, wherein in the steps of inserting the rotating blades and welding the rotating blades, first, a first rotating blade is introduced by its blade foot or by its adapter into a groove of the basic rotor body, that subsequently, the first rotating blade is welded to the basic rotor body via at least one weld running in the axial direction of the basic rotor body, and that following this, every other rotating blade is joined to the basic rotor body in this same way.

10. The method according to claim 1, wherein the rotating blades are welded to the basic rotor body via at least one circumferential weld in the circumferential direction of the basic rotor body and/or via welds extending in the radial direction of the basic rotor body.

11. A method for manufacturing an integrally bladed rotor, comprising the steps of:

provimg a basic rotor body having an axial direction;

providing grooves into the basic rotor body, the grooves extending substantially in the axial direction of the basic rotor body;

providing rotating blades, each rotating blade having a blade foot;

introducing the rotating blades into their respective grooves by their blade feet or by adapters attached to the blade feet;

welding the rotating blades to the basic rotor body; and at least partially removing the shoulders delimiting the grooves of the basic rotor body.

12. The method according to claim 11, wherein each shoulder that is positioned between two adjacent grooves and extends substantially in the axial direction of the basic rotor body is at least partially removed by defining a borehole in each shoulder, which is introduced along the respective shoulder that is to be removed in the integrally bladed gas turbine rotor.

* * * * *